(12) United States Patent
Ogava

(10) Patent No.: US 7,663,282 B2
(45) Date of Patent: Feb. 16, 2010

(54) TRACTION DRIVE FOR ELEVATOR

(75) Inventor: Mario Yoshitaro Ogava, São Paulo (BR)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 11/739,296

(22) Filed: Apr. 24, 2007

(65) Prior Publication Data
US 2007/0267930 A1 Nov. 22, 2007

(30) Foreign Application Priority Data
Apr. 24, 2006 (EP) ................................. 06112949

(51) Int. Cl.
*H02K 1/27* (2006.01)
(52) U.S. Cl. .................. 310/156.56; 310/156.53; 187/258
(58) Field of Classification Search ............ 310/156.56, 310/156.53; 187/258, 254
See application file for complete search history.

(56) References Cited

U.S. PATENT DOCUMENTS

| | | | | |
|---|---|---|---|---|
| 4,283,875 | A | * | 8/1981 | Daniels .................... 43/18.1 R |
| 4,403,161 | A | * | 9/1983 | Miyashita et al. ....... 310/156.83 |
| 4,464,595 | A | * | 8/1984 | Hamano et al. ......... 310/154.07 |
| 4,468,005 | A | * | 8/1984 | Nakamura .................... 254/350 |
| 4,469,308 | A | * | 9/1984 | Nakamura et al. ........... 254/350 |
| 4,587,449 | A | * | 5/1986 | West ....................... 310/154.27 |
| 4,594,525 | A | * | 6/1986 | Stokes .................... 310/156.13 |
| 4,625,392 | A | * | 12/1986 | Stokes .......................... 29/598 |
| 4,793,054 | A | * | 12/1988 | Abbratozzato et al. ......... 29/596 |
| 4,794,291 | A | | 12/1988 | Abukawa et al. |
| 4,954,736 | A | * | 9/1990 | Kawamoto et al. ...... 310/156.21 |
| 5,018,603 | A | * | 5/1991 | Ito .............................. 187/254 |
| 5,033,588 | A | * | 7/1991 | Nakai et al. .................. 187/289 |
| 5,264,749 | A | * | 11/1993 | Maeda et al. ........... 310/154.07 |
| 5,338,264 | A | * | 8/1994 | Kempf ........................ 474/168 |
| 5,378,953 | A | * | 1/1995 | Uchida et al. ........... 310/156.59 |
| 5,397,951 | A | * | 3/1995 | Uchida et al. ........... 310/156.21 |
| 5,697,848 | A | | 12/1997 | Bosley |
| 5,786,650 | A | * | 7/1998 | Uchida et al. ........... 310/156.55 |
| 5,788,018 | A | * | 8/1998 | Mendelsohn et al. ......... 187/404 |
| 5,939,809 | A | * | 8/1999 | Mobius ................... 310/156.28 |
| 6,094,119 | A | * | 7/2000 | Reznik et al. ................ 335/284 |
| 6,271,613 | B1 | * | 8/2001 | Akemakou et al. .......... 310/181 |

(Continued)

FOREIGN PATENT DOCUMENTS

EP 0180120 A 5/1986

(Continued)

*Primary Examiner*—Quyen Leung
*Assistant Examiner*—Naishadh N Desai
(74) *Attorney, Agent, or Firm*—Fraser Clemens Martin & Miller PLLC; William J. Clemens

(57) ABSTRACT

A traction drive for an elevator comprises a sheave for actuating a transmission device of the elevator and a synchronous motor, the synchronous motor comprising a stator with at least one winding for generating a magnetic field rotating around a motor axis and a rotor comprising at least one permanent magnet, the rotor being coupled to the sheave for transmitting a torque. The permanent magnet is longer in the motor axis direction than the stator core and/or the rotor is composed from a plurality of separate permanent magnets and separate magnetic sectors provided alternating in a circumferential direction perpendicular to the motor axis to concentrate the magnetic flux in axial and/or radial direction.

13 Claims, 1 Drawing Sheet

U.S. PATENT DOCUMENTS

| | | | |
|---|---|---|---|
| 6,342,745 B1 * | 1/2002 | Sakai et al. | 310/156.56 |
| 6,472,789 B1 * | 10/2002 | Akemakou | 310/156.57 |
| 6,522,042 B1 * | 2/2003 | Du et al. | 310/154.03 |
| 6,601,828 B2 * | 8/2003 | Strbuncelj et al. | 254/266 |
| 6,727,627 B1 * | 4/2004 | Sasaki et al. | 310/211 |
| 6,822,359 B2 * | 11/2004 | Joho | 310/156.23 |
| 6,974,522 B2 * | 12/2005 | Peresada et al. | 156/293 |
| 7,116,026 B2 * | 10/2006 | Kuwabara et al. | 310/156.21 |
| 2002/0135252 A1 * | 9/2002 | Burton | 310/156.12 |
| 2002/0163270 A1 * | 11/2002 | Almada | 310/156.47 |
| 2002/0171307 A1 * | 11/2002 | Verbrugge et al. | 310/156.12 |
| 2003/0025408 A1 * | 2/2003 | Miekka et al. | 310/68 R |
| 2004/0004407 A1 | 1/2004 | Laurent et al. | |
| 2004/0108789 A1 | 6/2004 | Marshall | |
| 2004/0217664 A1 * | 11/2004 | Kuwabara et al. | 310/156.21 |
| 2005/0088052 A1 | 4/2005 | Ionel et al. | |
| 2005/0161413 A1 * | 7/2005 | Close | 211/51 |
| 2005/0168089 A1 | 8/2005 | Miyashita et al. | |
| 2006/0060428 A1 * | 3/2006 | Hashiguchi | 187/254 |

FOREIGN PATENT DOCUMENTS

| | | | |
|---|---|---|---|
| EP | 385254 A1 * | 9/1990 | |
| EP | 0445308 A | 9/1991 | |
| EP | 0473534 A2 | 3/1992 | |
| EP | 1 630 120 | 3/2006 | |
| EP | 1630120 A1 * | 3/2006 | |
| EP | 1655259 A1 * | 5/2006 | |
| GB | 2125362 A * | 3/1984 | |
| JP | 1206859 A | 8/1989 | |
| JP | 01231631 A * | 9/1989 | |
| JP | 11032462 A * | 2/1999 | |
| JP | 11079627 A * | 3/1999 | |
| JP | 2001322781 A * | 11/2001 | |
| JP | 2002101615 A * | 4/2002 | |
| JP | 2002274770 A * | 9/2002 | |
| JP | 2002345227 A | 11/2002 | |
| JP | 2005253146 A | 9/2005 | |
| WO | 9105396 A | 4/1991 | |
| WO | WO 2005012154 A1 * | 2/2005 | |

* cited by examiner

TRACTION DRIVE FOR ELEVATOR

FIELD OF THE INVENTION

The present invention relates to a traction drive for an elevator with a sheave actuating a transmission means of the elevator and a synchronous permanent magnet motor coupled to the sheave.

BACKGROUND OF THE INVENTION

It is well known to use synchronous motors with permanent magnet rotors in a traction drive for an elevator. In such motors, a stator (or armature) comprises one or more windings for generating a rotating magnetic field around a motor axis. This magnetic field interacts with the magnetic field produced by one or more permanent magnets provided on a rotor that is accommodated inside the stator bore, thereby rotating the rotor.

U.S. Pat. No. 6,822,359 B2 shows a rotor for a synchronous motor wherein the permanent magnets are arranged on the rotor's circumferential surface. However, these permanent magnets must have a high flux density to generate the necessary torques to lift an elevator's car. Such permanent magnets with high flux density, made from sintered Rare Earth materials for example, are expensive, thereby increasing the overall costs for the traction drive. Moreover, if the flux density of such external permanent magnets is too small, these magnets cannot resist current overloads within the stator's windings without loosing their magnetic characteristic.

Thus it is known, for example from U.S. Pat. No. 5,697,848 or U.S. Patent Publication No. 2005/0168089 A1 to place the permanent magnets within the rotor itself. Thereby, rotor material adjacent to the permanent magnets increases the magnetic flux in radial direction, allowing use of magnets with lower flux density that furthermore can resist current overloads without loosing their magnetic characteristic.

However, to generate sufficient torques with such low flux density magnets, these permanent magnets must have a larger volume. Since the permanent magnets are inserted into a rotor core from the outer rotor diameter, these magnets must be small in a direction perpendicular to the median plane (circumferential). Thus, in order to realize the necessary volume, these magnets at the same time must be large in a radial direction that results in large rotor diameters, thereby increasing the overall size of the traction drive. This is disadvantageous in particular with elevators with a small or no machinery room.

As a result, providing said permanent magnets within a rotor core, that is assembled on a shaft for torque transmission, presents its normal difficult in manufacturing, limits the size and thereby the magnetic flux of the such-integrated permanent magnets and increases the rotor diameter due to the separated rotor core.

SUMMARY OF THE INVENTION

Therefore, it is an object of the present invention to provide a traction drive for an elevator, which is sufficiently small in size but at the same time does not require expensive permanent magnets with high flux density.

A traction drive for an elevator according to the present invention comprises a sheave for actuating as a transmission means of the elevator with two or more ropes or belts, and a synchronous motor. Said synchronous motor has a stator with one or more windings for generating a rotating magnetic field around a motor axis, and a rotor comprising at least one permanent magnet, said rotor being coupled to said sheave for transmitting a torque and thereby applying a traction force upon said transmission means.

According to a first aspect of the present invention, said at least one permanent magnet is longer in the motor axis direction than in the stator core. Thereby, the magnetic flux β of the permanent magnet is concentrated in axial direction toward the stator core, thus increasing the magnetic flux usable for torque generation advantageously.

Assume, for purpose of explanation only, that the permanent magnet is a bar that extends substantially in the motor axis direction with the magnet's north-south pole axis being orientated perpendicular to the motor axis. Then the magnetic field lines of such permanent magnet basically run in planes perpendicular to the motor axis. However, at the axial ends of such bar-like permanent magnet, the magnetic field lines are spread into a semi-sphere. Thus, the magnetic flux at these axial ends is reduced.

According to the first aspect of the present invention, by extending the permanent magnet beyond the stator core, i.e. by locating these axial ends and their reduced magnetic flux at the outside of the stator core, the inside magnetic flux between permanent magnet and stator core substantially results in a homogeneous magnetic field lines perpendicular to the motor axis. Therefore, by choosing the permanent magnet's length larger than the stator core length, the magnetic flux is concentrated in axial direction.

This effect is even amplified by another effect: since the magnetic field from permanent magnets cross the air gap toward the stator core, these magnetic field lines are additionally concentrated in radial direction from the axial ends of the permanent magnet.

Due to the such-concentrated magnetic flux, permanent magnets with a low flux density can be used, thereby decreasing the overall costs of the traction drive advantageously. At the same time, due to the concentrated magnetic flux, sufficient motor torques can be generated. As a result, also permanent magnets, which are smaller in radial direction and thereby decrease the rotor diameter can be used, still generating a sufficient motor torque.

According to a second aspect of the present invention, the rotor is composed from a plurality of separate permanent magnets and separate magnetic sectors provided alternating in a plane perpendicular to the motor axis. This results in a very compact rotor of small size, since the permanent magnets form part of the rotor and no separate rotor core is necessary. Instead, the rotor core forms the shaft itself. Such a traction drive is particular useful for elevator systems where no separate machinery room is provided.

In a traction drive according to the second aspect of the present invention, permanent magnets, which can be larger in circumferential direction and thereby have larger volumes, resulting in an increased magnetic flux, can easily be integrated into the rotor, thus compensating their low flux density. In contrast to conventional synchronous permanent motors with internal permanent magnets, with the second aspect of the present invention the permanent magnets are not inserted from the outside, but assembled together with the separate magnetic sectors to compose the rotor. This allows providing permanent magnets with larger circumferential dimensions. As a result, a sufficient magnetic flux defined by the product of the lower magnetic flux density and the larger volume of the permanent magnets can be realized although the rotor diameter is kept small.

Also this effect is amplified by another effect: the magnetic sectors concentrate the magnetic flux of the adjacent permanent magnets in radial direction, thereby yet increasing the effective magnetic flux generating the motor torque. Thereto, the magnetic sectors preferably are made from ferromagnetic material, whose permeability is significantly greater than one ($\mu_r \gg 1$) like for example steel or the like, or from paramagnetic material, whose permeability is equal or greater than one ($\mu_r > 1$) like for example aluminum alloy or the like.

In a preferred embodiment, both aspects of the present invention are superposed. By providing a rotor with one or more permanent magnets which are longer in the motor axis direction than the stator core, thereby concentrating the magnetic flux in axial direction, and with separate magnetic sectors arranged adjacent to these permanent magnets, thereby additionally concentrating the magnetic flux in the radial direction perpendicular to the motor axis, permanent magnets with a low flux density may be used. Therefore, sufficiently high motor torques can be generated with less costly and more robust magnets. Moreover, the magnetic sectors increase the permanent magnets' capability of enduring current overloads in the stator windings. Furthermore, small rotor diameters can be realized, thus reducing the overall size of the traction drive. Moreover, such rotors can be manufactured easily, still allowing to integrate permanent magnets with large circumferential dimensions.

As a result, permanent magnets with low flux density (which are cheap) and small radial dimensions (reducing the rotor diameter) can generate sufficient magnetic flux due to the radial and axial flux concentration and, preferably, the larger circumferential dimensions of the permanent magnets.

In particular the permanent magnets may be made from Ferrite or a Rare Earth Element, bonded with polymers.

In a preferred embodiment of the present invention the magnetic sectors are made of ferromagnetic or paramagnetic sheets, fixed to one another non-removably. The sheets may be fixed to one another by any suitable technique, in particular by welding, bonding, sintering, moulding or by an adhesive. Alternatively, such sheets may be fixed to one another by holding means like bands, screws or the like. Thus, lightweight magnetic sectors of arbitrary design can be manufactured. In particular, the magnetic sectors may be of cake-slice form, thus forming a substantially cylindrical rotor when assembled with one another.

The permanent magnets and magnetic sectors may be detachably fixed to one another by holding means. In a preferred embodiment, these holding means are made from a non-magnetic material. Holding means may comprise bands wound around the magnetic sectors and permanent magnets and/or axial end plates to which the magnetic sectors and/or permanent magnets are fixed, for example by screws or elastic notches. Thereby single magnetic sensors or permanent magnets may be replaced easily, thus improving maintenance. Alternatively, the permanent magnets and magnetic sectors may be fixed to one another non-removably, in particular by welding, bonding, sintering, moulding or by an adhesive. With the permanent magnets and magnetic sectors being assembled together, either detachable or non-removably, it is also possible to manufacture the rotors in a modular way. For example, if a lighter, cheaper rotor with less magnetic flux is required, one or more of the permanent magnets may be replaced by non-magnetic dummies.

Thus, the rotor can be manufactured in a fast, cheap and simple way by just assembling the magnetic sectors and the permanent magnets and fixing them together. In a preferred embodiment, the magnetic sectors, when assembled together, form cavities accommodating the permanent magnets, which thereby are securely fixed within the rotor.

In a preferred embodiment, the rotor and the sheave are coupled to one another by elastic means. Thus, no separate shaft is necessary to transmit the motor torque to the shaft. Furthermore, vibrations induced by the motor or the sheave can be damped. Yet furthermore, a misalignment between the rotor axis and the sheave axis can be compensated. Moreover, variations of the motor torque can be absorbed without being transmitted directly upon the elevator cabin. Vice versa variations of the load upon the sheave do not directly act upon the synchronous motor, thereby protecting it from overload advantageously.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
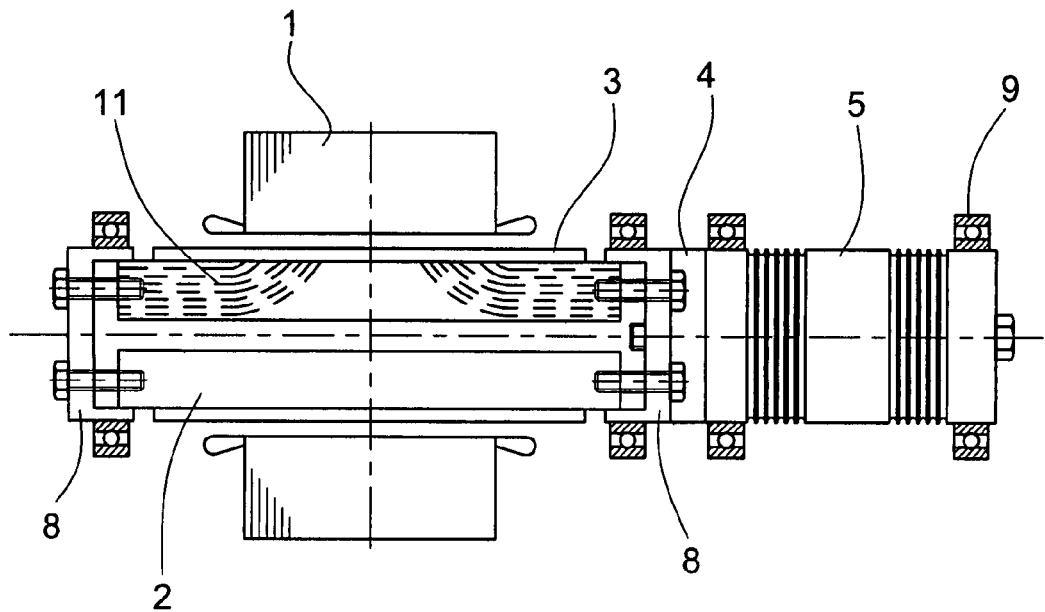
FIG. 1 is a sectional view along the motor axis of a traction drive according to one embodiment of the present invention.

As shown in FIG. 1, a traction drive according to one embodiment of the present invention comprises a sheave 5 for applying a traction force upon a transmission means of an elevator (not shown). The traction drive may be installed within the elevator's passage itself or within a separate machinery room (also not shown).

A rotor 3 is coupled to said sheave 5 by elastic means 4. Said means may be made from any elastic material capable to transmit the motor torque. In particular said elastic means may be made from plastic or resin that advantageously may contain fibres (carbon or glass fibres for example) to reinforce the matrix material. In another embodiment, a metal plate may be shaped accordingly to provide the desired elastic characteristic.

Around said rotor 3 a stator 1 is provided accommodating the rotor along its axis. Said stator is composed from steel sheets provided with grooves for accommodating one or a plurality of windings constituting a plurality of coils (not shown). Advantageously, a conventional stator can be used in a traction drive according to one embodiment of the present invention.

Figure 2:
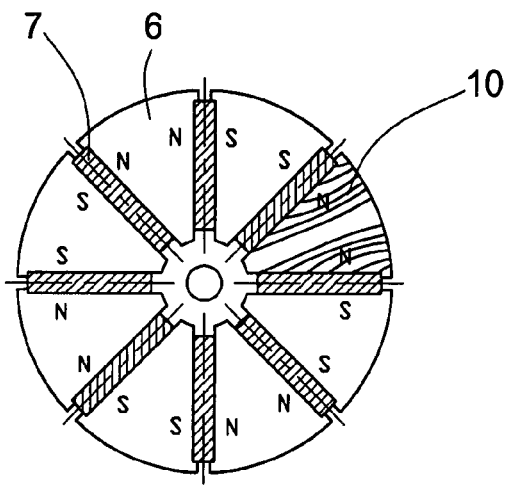
FIG. 2 is a sectional view of the rotor of the traction drive of FIG. 1 in a plane perpendicular to the motor axis.

The rotor structure may be seen best from FIG. 2, showing a sectional view perpendicular to the motor axis. As it is shown in FIG. 2 as an example, the rotor 3 is composed from eight magnetic sectors 6 and eight permanent magnets 7 placed alternating adjacent to one another in a circumferential direction. Therein, "N" and "S" denote a north and south pole respectively of the single permanent magnets 7 which are orientated with corresponding poles adjacent to one another.

Figure 3:
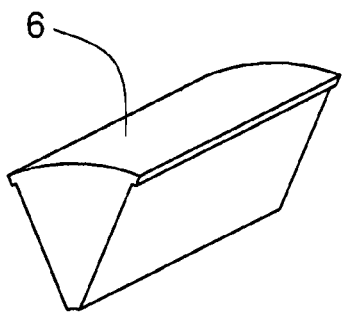
FIG. 3 is a perspective view of a magnetic sector of the rotor of FIG. 2.

As it can be seen from FIG. 3, each magnetic sector 6 has as substantially cake-slice section with a radially inner tapered end so that all magnetic elements 6 assembled together basically form a cylinder with a central axis aligned with the motor axis. The radially inner and outer ends of each magnetic sector 6 protrude in the circumferential direction, thus forming cavities in-between adjacent magnetic sectors that accommodate the substantially bar-like permanent magnets.

The magnetic sectors 6 are fixed to pot-like (cup shaped) holding means 8 by screws at both axial ends. These holding means 8 are supported via bearings 9 by the motor housing (not shown). Thus, the complete rotor 3 is composed from the magnetic sectors 6 and the permanent magnets 7 without a separate motor shaft, thereby decreasing the rotor's diameter while at the same time the volume of the permanent magnets 7 is such that also with low flux density magnets a sufficient motor torque can be generated. Moreover, the manufacturing of the complete rotor is cheap and simple, just requiring to fix the magnetic sectors and permanent magnets 7 with one another, e.g. by holding plates 8 as shown in this embodiment. In another embodiment (not shown) the magnetic sectors 6 and permanent magnets 7 are fixed to one another by welding the magnetic sectors 6 together at their outer circumferential protrudings.

The magnetic sectors of this embodiment are made as one piece from a ferromagnetic material like steel. Thus they concentrate the magnetic flux 10 in radial direction as it is indicated in FIG. 2. Therefore, in spite of the small rotor diameter, sufficient motor torque can be generated with this traction drive. A similar but smaller effect applies with magnetic sectors made from paramagnetic material.

In an alternative embodiment (not shown) the magnetic sectors are composed from single sheets fixed to one another for example by welding. Thus, lightweight magnetic sectors can be provided, thereby reducing the overall weight of the traction drive.

As shown in FIG. 1, the length of the permanent magnets in the motor axis direction is larger than the length of the stator 1 in the axial direction, i.e. the rotor protrudes beyond the stator. Thereby, the magnetic flux 11 is concentrated in the axial direction as indicated in FIG. 1.

With the magnetic flux 11 in the axial direction and the magnetic flux 10 in the radial direction thus concentrated by the permanent magnets dimensions and the adjacent magnetic sectors 6, the permanent magnets 7 can be made from a cheap material with low flux density like Ferrite, yet generating high motor torques and resisting current overloads.

One preferred embodiment of the present invention may be summarised as follows: a traction drive for an elevator comprises a sheave 5 for actuating a transmission means of the elevator and a synchronous motor, said synchronous motor comprising a stator 1 with at least one winding for generating a rotating magnetic field around a motor axis and a rotor 3 comprising at least one permanent magnet 7, said rotor being coupled to said sheave for transmitting a torque. According to the present invention said permanent magnet 7 is longer in the motor axis direction than the stator winding and/or said rotor is composed from a plurality of separate permanent magnets 7 and separate magnetic sectors 6 provided alternating in a circumferential direction perpendicular to the motor axis to concentrate the magnetic flux in axial and/or radial direction.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A traction drive for an elevator, comprising:
   a sheave for actuating a transmission means of the elevator; and
   a synchronous motor coupled to said sheave, said synchronous motor including,
   a stator with at least one winding for generating a rotating magnetic field around a motor axis, and
   a shaftless rotor having a plurality of permanent magnets and magnetic sectors, said rotor being formed from said permanent magnets and said magnetic sectors alternating in a circumferential direction about the motor axis and wherein said permanent magnets are longer in a direction of the motor axis than a core of said stator.

2. The traction drive according to claim 1 wherein said permanent magnets and said magnetic sectors are detachably fixed to one another by holding means formed from a non-magnetic material.

3. The traction drive according to claim 1 wherein said permanent magnets and said magnetic sectors are fixed to one another non-removably by at least one of welding, bonding, sintering, molding and an adhesive.

4. The traction drive according to claim 1 wherein said permanent magnets have a low flux density.

5. The traction drive according to claim 4 wherein said permanent magnets are made from one of a Ferrite material, a Rare Earth element bonded with polymers or a Rare Earth element.

6. The traction drive according to claim 1 wherein said magnetic sectors are made as one piece from a ferromagnetic material or a paramagnetic material.

7. The traction drive according to claim 1 wherein said magnetic sectors are made of ferromagnetic or paramagnetic sheets, fixed to one another detachably by holding means.

8. The traction drive according to claim 1 wherein said magnetic sectors are made of ferromagnetic or paramagnetic sheets, fixed to one another non-removably by at least one of welding, bonding, sintering, molding and. an adhesive.

9. The traction drive according to claim 1 wherein said rotor and said sheave are coupled to one another by elastic means.

10. A traction drive for an elevator, comprising:
    a sheave for actuating a transmission means of the elevator;
    a synchronous motor, said synchronous motor including,
    a stator with at least one winding for generating a rotating magnetic field around a motor axis, and
    a shaftless rotor having a plurality of permanent magnets and magnetic sectors, said rotor being formed from said permanent magnets and said magnetic sectors alternating in a circumferential direction about the motor axis and wherein said permanent magnets are longer in a direction of the motor axis than a core of said stator; and
    elastic means coupling said rotor and said sheave to one another, wherein the elastic means is disposed axially between the rotor and the sheave and is in direct axial contact with the rotor and the sheave.

11. The traction drive according to claim 10 wherein said permanent magnets and said magnetic sectors are detachably fixed to one another by cup-shaped holders disposed at axial ends of the rotor, wherein the axial ends of the rotor are radially disposed within the cup-shaped holders, wherein the cup-shaped holders are formed from a non-magnetic material.

12. The traction drive according to claim 11 wherein said holding means are supported by bearings.

13. The traction drive according to claim 10 wherein said permanent magnets and said magnetic sectors are fixed to one another non-removably by at least one of welding, bonding, sintering, molding and an adhesive.

* * * * *